April 23, 1957 R. H. HINCKLEY ET AL 2,790,077
GATED CATHODE FOLLOWERS
Filed April 23, 1952

INVENTORS
ROBERT H. HINCKLEY
PAUL W. BORGESON
BY Elmer J. Gorn
ATTORNEY

United States Patent Office 2,790,077
Patented Apr. 23, 1957

2,790,077

GATED CATHODE FOLLOWERS

Robert H. Hinckley, Watertown, Mass., and Paul W. Borgeson, Los Angeles, Calif., assignors to Raytheon Manufacturing Company, Newton, Mass., a corporation of Delaware Application April 23, 1952, Serial No. 283,964

3 Claims. (Cl. 250—27)

This invention relates to switching circuits and, more particularly, to gated pentodes used as cathode followers.

In many applications it is desirable to obtain the advantages of both a gated pentode and a cathode follower. In order to achieve these advantages by conventional methods, it is necessary to use three stages comprising a gated pentode, an inverter stage, and a cathode-follower stage. By the use of the present invention, this result can be achieved in a single stage.

In the circuit of the present invention, the plate of a pentode is connected to a source of positive potential that is returned to the cathode through a cathode resistor. The screen grid is connected to the plate through a resistor and is coupled to the cathode through a capacitor. The gating pulses are coupled to the suppressor grid which is maintained at cutoff potential. The signal pulses are coupled to the control grid which is also maintained at cutoff potential. In the absence of any signal the tube does not conduct, but the capacitor between the screen grid and cathode charges up to the potential of the screen grid. When a signal pulse is present in the control grid, but no gating pulse is present at the suppressor grid, the tube conducts through the cathode-to-screen space only. This conduction serves to discharge the capacitor in the circuit between these electrodes, but, if the component values are properly selected with reference to the signal pulse duration, little or no current is permitted to flow through the cathode resistor and no appreciable signal appears at the output. When a gating pulse appears at the suppressor grid when no signal pulse is present at the control grid, the tube does not conduct because of the bias on the control grid, and no signal appears in the output. When a signal pulse appears at the control grid at the same time that a gating pulse appears at the suppressor grid, the tube conducts through the plate-to-cathode space and current flows through the cathode resistor producing a signal at the output.

Other and further objects and advantages of the invention will become apparent as the description thereof progresses, reference being had to the accompanying drawings wherein.

Figure 1:
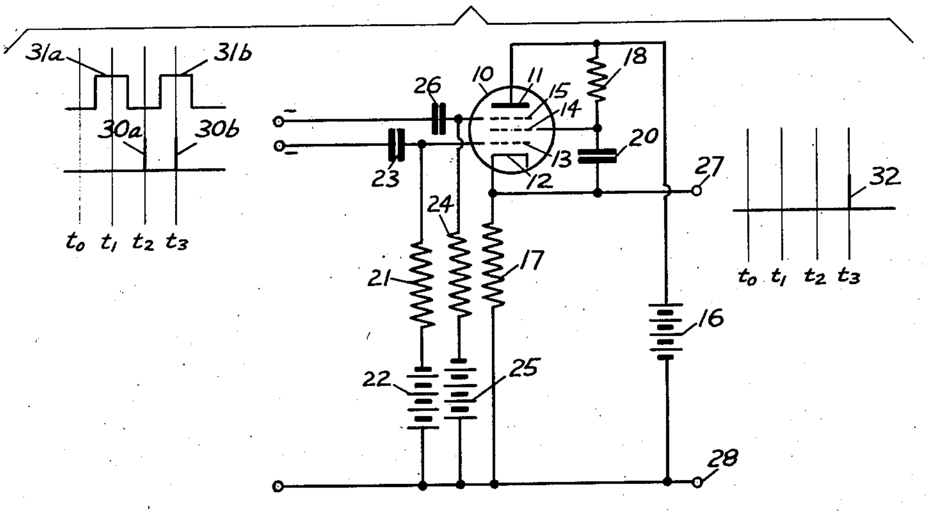
Fig. 1 is a schematic of a circuit embodying the invention.

In Fig. 1, the reference numeral 10 refers to a pentode having a plate 11, a cathode 12, a first grid 13, a second grid 14, and a third grid 15. The plate 11 is connected to the cathode 12 through a source of positive potential 16 and an impedance shown as a resistor 17. The second, or screen grid 14, is connected to the source of positive potential 16 through a resistor 18. A capacitor 20 is connected between the screen grid 14 and the cathode 12. The output is taken from across the resistor 17. The first control grid 13 is connected to the cathode 12 through a resistor 21 and a source of negative potential 22. This grid is also coupled to a source of signals through a capacitor 23. The third control grid 15 is connected to the cathode 12 through a resistor 24 and a source of negative potential 25. This grid is also coupled to a source of gating pulses through a capacitor 26. The output signal from across the resistor 17 is connected to output terminals 27 and 28.

The signals applied to the control grid 13 are shown as narrow pulses 30*a* and 30*b* in the lower of the two graphs to the left of Fig. 1. The gating pulses applied to the suppressor grid 15 are shown as relatively wide square pulses, 31*a* and 31*b*, in the upper of the two graphs shown at the left of Fig. 1. At a time $t_0$ when the potentials are applied to the tube, there is no signal of either type. The capacitor 20 is charged at the screen grid potential but the tube does not conduct due to the control grid 13 and the suppressor grid 15, both being held at cutoff potential by the sources 22 and 25, respectively. At the time $t_1$ there is a gating pulse 31*a* at the suppressor grid but there is no signal pulse at the control grid 13. The tube does not conduct because the control grid 13 is maintained at cutoff by the source 22. At the time $t_2$ there is a signal pulse 30*a* at the control grid 13 but no gating pulse at the suppressor grid 15. As a result, there is conduction between the cathode 12 and the screen grid 14 but none through the plate circuit. This cathode-to-screen grid conduction serves to discharge the capacitor 20 through the interelectrode space and very little current flows through the cathode resistor 17. As a result very little, if any, signal appears at the output terminals 27 and 28. At the time $t_3$ both a signal pulse 30*b* and a gating pulse 31*b* appear at the control grid 13 and the suppressor grid 15, respectively, and the tube conducts through the cathode-to-plate space, and current flows through the cathode resistor 17. As a result, a signal appears at the output terminals 27 and 28 represented by the pulse 32 in the graph at the right of Fig. 1.

Figure 2:
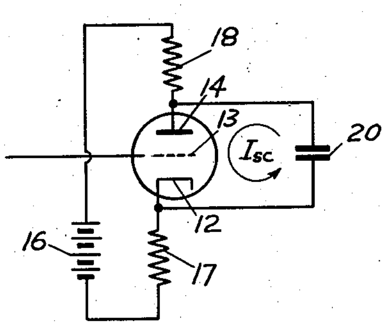
Fig. 2 is the screen grid-to-cathode circuit of Fig. 1 redrawn as a triode circuit.

The effect of the capacitor 20 in preventing current flowing through the cathode resistor 17, when the signal pulse 30*a* appears at the control grid 13 in the absence of a gating pulse at the suppressor grid 15, can be more clearly seen in the redrawn diagram of the screen grid circuit in Fig. 2. Here the cathode 12, the control grid 13, and the screen grid 14 are considered as forming the elements of a triode. It will be seen that two paths are provided for the screen grid current under these conditions. The first path is directly through the capacitor 20, in which the charging capacitor 20 may be considered as acting as a battery. This path is virtually a short circuit when the tube first conducts. The second path is from the source 16 through the resistor 18, through the screen grid, and through the screen-to-cathode interelectrode space through the tube, and through the cathode resistor 17 back to the source 16. As this path includes the cathode resistor 17, from across which the output signal is taken, any current flowing in the resistor will produce an output signal which is undesired under the conditions specified. However, when the conduction between the cathode and the screen grid starts, the capacitor is virtually a short circuit and almost all the current passes through this short loop, leaving little to flow through the cathode resistor to develop a signal. Circuits of this type have been designed in which the voltage appearing across the cathode resistor, when only a signal pulse and no gating pulse is present, is less than a tenth of a voltage appearing across this resistor when both a signal and a gating pulse are present.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a gated amplifier of the type comprising an electron discharge device having a cathode, a plate, a first, a second and a third grid with the first and third grids maintained at cutoff potential in the absence of a signal and a source of potential with its positive terminal connected to the plate and second grid and its negative terminal connected to the cathode through an impedance, a capacitor connected directly between the second grid and the cathode to prevent the appearance of a voltage across the cathode impedance except when a signal is present at both the first and third grids.

2. In a gated amplifier circuit the combination of an electron discharge device having a cathode, a plate, a first, a second and a third grid with means for coupling said first grid to a source of signals and to a source of fixed negative potential, means for coupling said third grid to a second source of signals and to a source of fixed negative potential, a capacitor connected directly between the second said grid and the cathode and an impedance connected between the cathode and a reference potential across which an output signal appears only when signals appear at both the first and third grids.

3. In a switching circuit the combination of an electron discharge device having a cathode, a plate, a first, a second and a third grid with means to apply fixed cutoff potentials to the first and third grids, means to apply a gating pulse to the third grid, means to apply a signal to the first grid, a source of potential with its positive terminal connected to the plate and to the second grid and its negative terminal connected to the cathode through an impedance, and a capacitor connected directly between the second grid and the cathode, so that an output signal appears across said impedance only when both the gating pulse and a signal appear at the first and third grids.

References Cited in the file of this patent

UNITED STATES PATENTS

| | | |
|---|---|---|
| 2,519,763 | Hoglund | Aug. 22, 1950 |
| 2,546,972 | Chatterjea et al. | Apr. 3, 1951 |
| 2,568,319 | Christensen | Sept. 18, 1951 |